United States Patent [19]
Burian et al.

[11] Patent Number: 5,239,772

[45] Date of Patent: Aug. 31, 1993

[54] RAILROAD CAR PESTICIDE DEVICE HOLDER

[75] Inventors: William F. Burian, Downer's Grove; Kathlynn R. Jahns, Woodridge; David A. Oestermeyer, Downers Grove, all of Ill.

[73] Assignee: Salco Products, Inc., Romeoville, Ill.

[21] Appl. No.: 988,846

[22] Filed: Dec. 10, 1992

[51] Int. Cl.⁵ .................................. A01K 1/20
[52] U.S. Cl. ............................ 43/131; 43/124; 239/34; 239/57; 105/377
[58] Field of Search ............. 43/131, 124, 132.1, 43/125, 126; 239/34, 57, 55, 289; 105/377

[56] References Cited

U.S. PATENT DOCUMENTS

| | | | |
|---|---|---|---|
| 2,857,630 | 10/1958 | Bishop | 43/124 |
| 3,896,995 | 7/1975 | Lelicoff | 43/132.1 |
| 3,931,692 | 1/1976 | Hermanson | 43/131 |
| 4,161,283 | 7/1979 | Hyman | 239/55 |
| 4,534,509 | 8/1985 | Holzner | 239/34 |

*Primary Examiner*—Kurt C. Rowan
*Assistant Examiner*—Chuck Y. Mah
*Attorney, Agent, or Firm*—Kinzer, Plyer, Dorn McEachran & Jambor

[57] ABSTRACT

A pesticide device holder for railroad cars has a frame resting in a hatch coaming. The frame has a gas-permeable underside support sheet and an impervious upper membrane. Pesticide devices, such as fumigant packages, rest between the support sheet and membrane. A separator is provided to prevent contact between the fumigant packages.

17 Claims, 2 Drawing Sheets

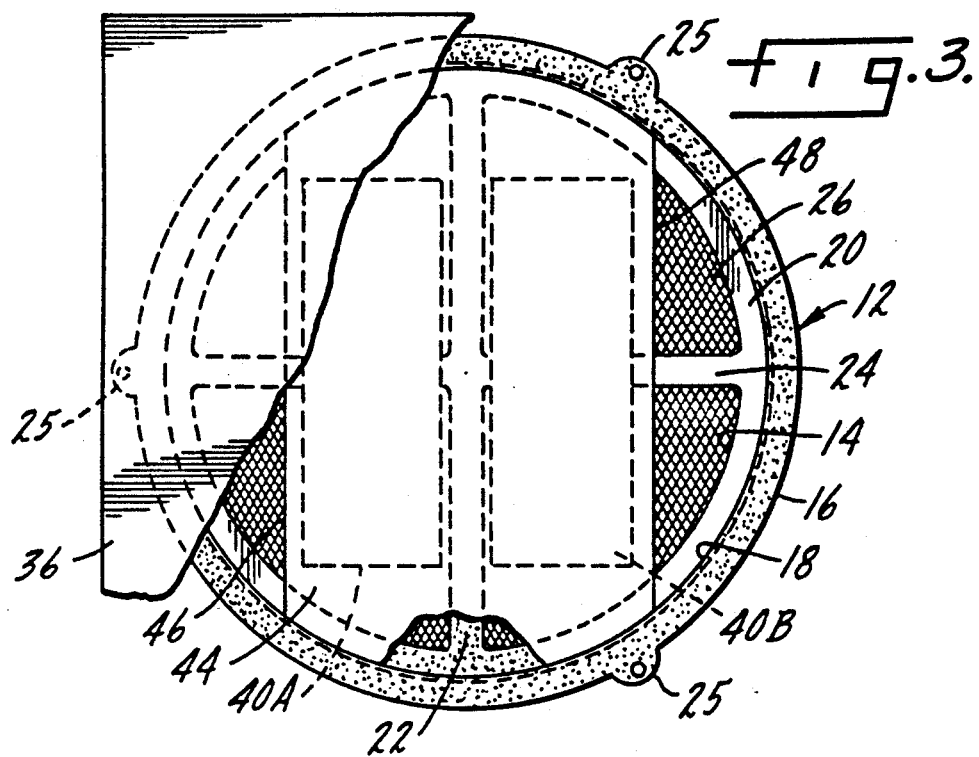
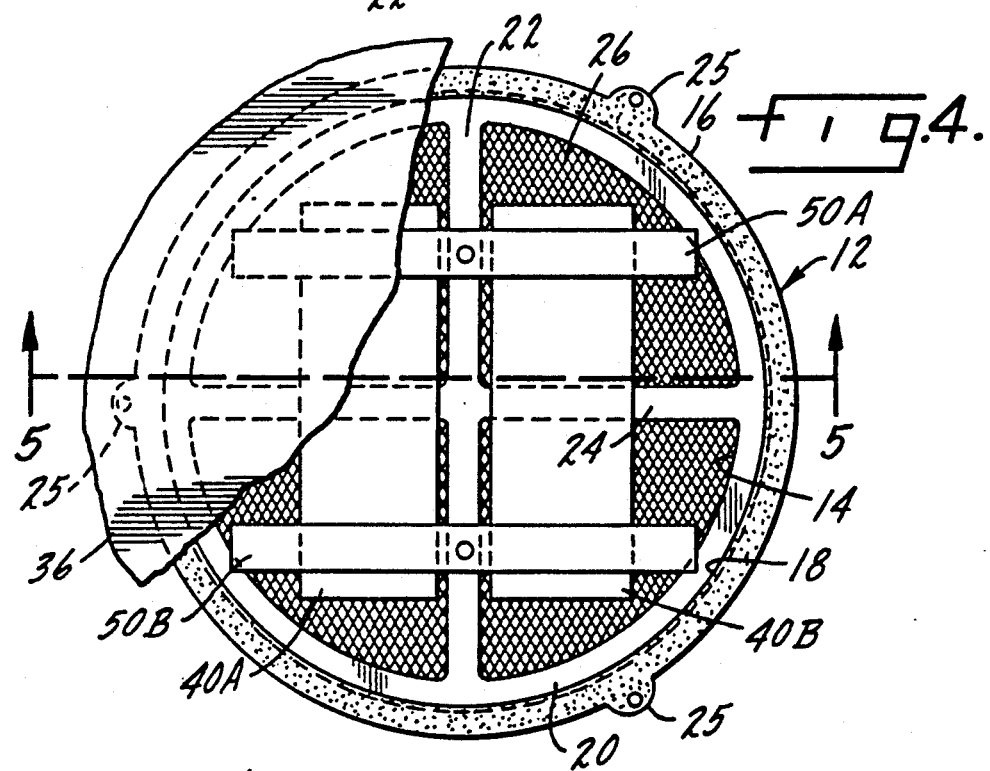
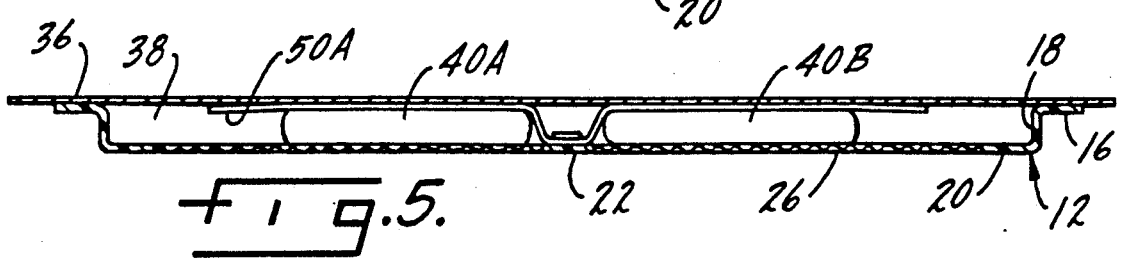

5,239,772

RAILROAD CAR PESTICIDE DEVICE HOLDER

BACKGROUND OF THE INVENTION

This invention relates to accessories for railroad cars and is particularly concerned with a method and apparatus for holding pesticide devices for preventing insect or other pest infestation. A typical pesticide device for use in rail cars is a fumigant package.

Railroad hopper cars and tank cars carrying food items such as flour, corn syrup or other food products are sometimes treated during shipment to prevent contamination by insects or other pests. This is particularly true where temperatures over 50° F. are expected to be encountered. One way this has been done is by fumigating the car interior. Fumigant is introduced by means of packages which are kept in sealed containers until a shipper is ready to use them. In the past the fumigant packages have been simply taped to corrugated cardboard panels or disks that are placed over the hatch opening or coaming, with the fumigant facing down into the car. A plastic cover is taped over the top of the cardboard and then the hatch cover is closed. Exposure of the fumigant package to air causes a chemical reaction which releases a fumigant such as hydrogen phosphide into the car.

The fumigant packages typically are strips about six inches wide by ten inches long, although other sizes and types of packages can be used. Two packages are needed at each hatch opening. The fumigant packages must not be allowed to come into contact with one another because under certain conditions contacting fumigant packages present both fire and explosion hazards. So the packages cannot be allowed to move around.

The corrugated cardboard mounting method used in the past leads to several problems. Taping the fumigant packages to the cardboard is a handling problem. Installing the cardboard in the hatch openings is laborious and slow. The cardboard panels or disks present disposal problems. And the corrugations of the cardboard present inviting hiding places for insects which, although they are killed by the fumigant, can be a contamination hazard upon unloading. That is, they tend to fall out of the corrugations into the hatch opening when the cardboard is removed for unloading. The present invention provides an improved holder for railroad car fumigant packages which overcomes these difficulties.

The invention is not limited to holding fumigant packages. Alternative methods of and devices for preventing pest infestation are possible. These include improved insecticides and mechanical methods such as baited traps and flypaper. The holder of the present invention could be used with these devices as well as with fumigant packages. The term pesticide devices is used herein to refer generally to fumigant packages, insecticides, flypaper or whatever device is used to prevent contamination of rail cars.

SUMMARY OF THE INVENTION

This invention concerns a pesticide device holder for railroad cars containing food items. A primary object of the invention is a pesticide device holder which affords safe, reliable installation in less time than prior holders.

Another object of the invention is a holder of the type described which is re-usable and reduces generation of waste material compared to present practice.

A further object is a holder which is economical to manufacture.

These and other objects which may become apparent are realized by a pesticide device holder having a frame sized to engage the coaming of a car hatch. The frame defines a central aperture. A gas-permeable support sheet is attached to the frame and extends across the central aperture. A gas-impermeable cover membrane is attached to the frame in spaced relation to the support sheet to define a pesticide device compartment between the membrane and sheet. Separator means divide the compartment into at least two pockets for receiving a pesticide device in each pocket. The pockets prevent contact between the devices. The separator can be a vertical wall integral with a cross rib of the frame.

BRIEF DESCRIPTION OF THE DRAWINGS

FIG. 3 is a plan view of a holder according to an alternate embodiment

FIG. 4 is a plan view of a further alternate embodiment.

FIG. 5 is a section taken along line 5—5 of FIG. 4.

DETAILED DESCRIPTION OF THE INVENTION

Figure 1:
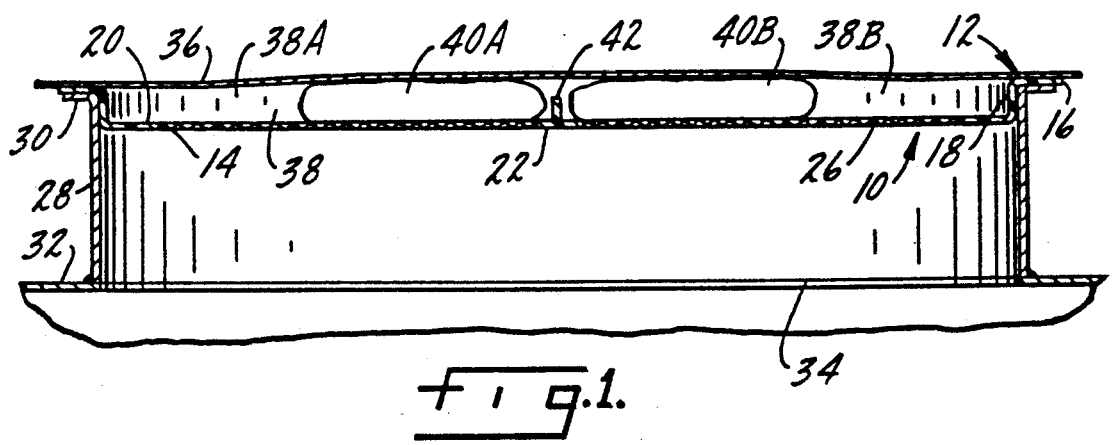
FIG. 1 is a section through a railroad car hatch opening, showing the coaming and pesticide device holder mounted thereon.
Figure 2:
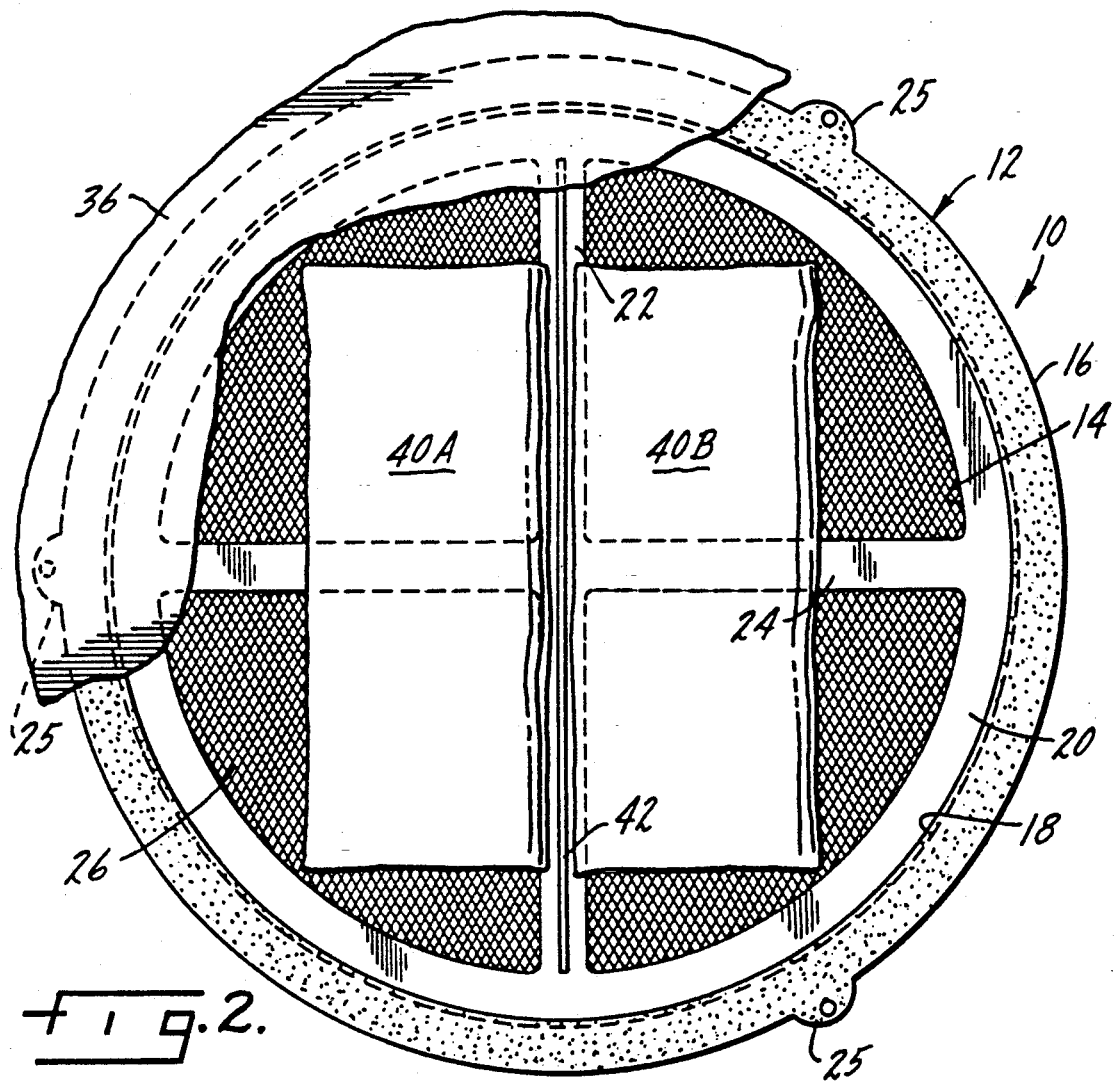
FIG. 2 is a plan view of the pesticide device holder of the present invention.

The pesticide device holder of the present invention is shown generally at 10 in FIGS. 1 and 2. The holder has a semi-rigid frame including a ring 12 which defines a central aperture 14. The ring 12 has a radial rim 16, an axial wall 18 and a radial flange 20. In the preferred arrangement the axial wall 18 is attached to the rim 16 near the inside diameter of the rim. The radial flange 20 is attached to the axial wall at a point where it is spaced from the rim 16. The radial flange extends inwardly from the axial wall. A pair of cross ribs 22 and 24 extend diametrically across the ring. The cross ribs are attached to the radial flange 20. At their intersection the cross ribs are joined to each other.

In the embodiment shown, the hatch opening is circular and accordingly the frame takes the form of the annular ring 12. It will be understood that some hopper cars now have a rectangular, trough-like opening extending along the peak of the car roof. The present invention could be used with these rectangular openings, in which the frame would be rectangular instead of round as shown.

The radial rim includes a plurality of tabs 25 having openings therein for receiving a tether (not shown). The tether has one end tied to a tab 25 and the other end fixed to the coaming or car roof for the purpose of retaining the holder 10 on the car. The tether is long enough to permit removal of the holder from the coaming for full access to the hatch. But the tether will prevent discarding of the holder.

A gas-permeable support sheet 26 is attached to the frame and extends across the central aperture 14. The support sheet overlies the aperture quadrants defined by the cross ribs 22 and 24. The sheet could be either two or four separate pieces joined to the radial flange 20 and the cross ribs 22, 24. Alternatively it could be a single circular sheet affixed around the perimeter of the flange 20 with a slot for a separator wall. In any case, the support sheet provides a floor closing off the central aperture 14 of the ring. The support sheet is preferably made of a thirty mesh material.

The annular ring 12 is sized to fit down in the top edge of the coaming of a hopper car hatch. The coaming is shown at 28 in FIG. 1 with the hatch cover removed. The coaming has a radial flange 30 at its outer end and is connected to a top wall 32 of the hopper car at its inner end. The coaming defines the hatch opening 34. The axial wall 18 preferably has a slight taper such that the outside diameter of the axial wall 18 is smaller at the flange 20 than at the rim 16. The outside diameter of the wall 18 at flange 20 is such that the ring 12 fits down inside the internal diameter of the coaming 28. The outside diameter of the wall 18 at the radial rim 16 is preferably such that rim 16 rests on the flange 30 of the coaming. Some flexing of the ring may be necessary to push the rim down on to the flange 30. This squeezing of the ring assists in retaining the holder in position.

The semi-rigid ring 12 permits easy removal of the pesticide device holder without having it collapse and spill contaminants through the hatch opening. By semi-rigid, it is meant that the holder can be picked up at one edge and opposite edges will remain generally in the same plane. The ring is preferably made of plastic material molded to the described configuration. The holder is placed on the coaming prior to closing the hatch cover. The holder remains in place during travel.

The holder 10 further includes a gas-impermeable cover membrane 36 attached to the frame in spaced relation to the support sheet 26 to define a pesticide device compartment 38 (FIG. 1) between the membrane 36 and sheet 26. The membrane is made of plastic and may be taped or adhesively fixed to the radial rim 16. A separator means divides the compartment 38 into at least two pockets 38A and 38B. The pockets receive at least two pesticide devices which in this case are fumigant packages 40A and 40B. It will be understood that the pockets could also receive other pesticide devices such as insecticide or flypaper.

The separator prevents contact between the fumigant packages. In the embodiment of FIGS. 1 and 2 the separator takes the form of a vertical wall 42 integrally formed on and extending upwardly from the cross rib 22.

FIG. 3 illustrates another form of separator. In this embodiment, the separator is a web 44 of permeable material (preferably thirty mesh) attached to the cross rib 22 and open at its sides 46 and 48. The web forms pockets into which the fumigant packages 40 can be inserted. That is, the packages are held between the support sheet 26 and the web 44.

FIGS. 4 and 5 show a further alternate form of the separator. Here the separator is a pair of hold-down bars 50A and 50B attached to the cross rib 22 and extending transversely thereto. The bars are located above the support sheet 26. The bars may be formed of the same semi-rigid plastic material as the frame. The free ends of the bars can be flexed upwardly to slip a fumigant package under them. The bars are sufficiently rigid to hold the packages in place.

The use and operation of the invention are as follows. A hatch cover is opened and the frame of the fumigant holder is placed onto the top of the coaming, as shown in FIG. 1. Two fumigant packages (or other pesticide devices) are removed from their storage containers and placed on the support sheet 26, one package in each pocket. The separator will prevent the two packages from coming into contact with one another. Next, the gas-impermeable cover membrane 36 is laid over the top of the frame in spaced relation to the support sheet 26. The membrane is fixed to the radial rim 16. Once the membrane is in place the gas cannot escape upwardly, it can only permeate the support sheet and move into the car. The final step is to close the hatch cover over the hatch opening. When the car arrives at its destination, the hatch cover is opened, the membrane removed and the spent fumigant packages can be removed from the holder, all in accordance with approved safety procedures.

It can be seen that the pesticide device holder of the present invention affords a simple, economical way to mount a device such as a fumigant package in the hatch opening of a railroad car. Whereas a preferred form of the invention has been shown and described, it will be understood that modifications could be made thereto without departing from the scope of the following claims.

We claim:

1. A pesticide device holder for a railroad car having a hatch opening defined by a coaming, the holder comprising:
   a frame sized to engage the coaming of a railroad car hatch and defining a central aperture;
   a gas-permeable support sheet attached to the frame and extending across the central aperture;
   a gas-impermeable cover membrane attachable to the frame in spaced relation to the support sheet to define a pesticide device compartment between the membrane and sheet; and
   separator means dividing said compartment into at least two pockets for receiving at least one pesticide device in each pocket and preventing contact between the devices.

2. The holder of claim 1 further characterized in that the coaming is circular and the frame is a semi-rigid, annular ring having an inside diameter less than that of the coaming and an outside diameter greater than that of the coaming such that the ring overlies the top of the coaming when installed.

3. The holder of claim 2 wherein the ring comprises a radial rim and an axial wall attached to the rim.

4. The holder of claim 3 wherein the axial wall is attached at the inside diameter of the rim.

5. The holder of claim 2 wherein the ring further comprises a radial flange attached to the axial wall, spaced from the radial rim.

6. The holder of claim 5 wherein the axial wall is attached at the inside diameter of the rim and the radial flange extends inwardly from the axial wall.

7. The holder of claim 6 wherein the support sheet is attached to the radial flange.

8. The holder of claim 2 further comprising at least one cross rib connected to the ring and extending across the central aperture.

9. The holder of claim 8 wherein the separator is a vertical wall connected to said cross rib and extending across the central aperture.

10. The holder of claim 8 wherein the separator is a web of permeable material attached to the cross rib and open at its sides.

11. The holder of claim 8 wherein the separator is a at least one hold-down bar attached to the cross rib and extending transversely thereto.

12. The holder of claim 1 further comprising at least one retainer tab.

13. The holder of claim 1 wherein the support sheet is made of thirty mesh filter material.

14. The holder of claim 1 wherein the separator is a vertical wall extending across the central aperture.

15. The holder of claim 1 wherein the pesticide device is a fumigant package.

16. A method of mounting a pesticide device in a railroad car having a hatch opening defined by a coaming, comprising the steps of:

providing a frame sized to engage the coaming and defining a central aperture;

providing a gas-permeable support sheet on the bottom of the frame and extending across the central aperture;

dividing the frame into at least two pockets for receiving at least one pesticide device in each pocket and preventing contact between said devices;

placing the frame in the coaming;

placing a pesticide device in each pocket; and attaching a gas-impermeable cover membrane to the top of the frame in spaced relation to the support sheet to define a pesticide device compartment between the membrane and sheet.

17. The method of claim 16 wherein the pesticide device is a fumigant package.

* * * * *